(12) United States Patent  (10) Patent No.: US 7,612,877 B2
Lin  (45) Date of Patent: Nov. 3, 2009

(54) INCLINED DETECTOR

(75) Inventor: George Lin, Yung Kang (TW)

(73) Assignee: MONY Industrial Co., Ltd., Tainan County (TW)

( * ) Notice: Subject to any disclaimer, the term of this patent is extended or adjusted under 35 U.S.C. 154(b) by 0 days.

(21) Appl. No.: 11/897,796

(22) Filed: Aug. 31, 2007

(65) Prior Publication Data

US 2009/0059212 A1  Mar. 5, 2009

(51) Int. Cl.
*G01C 1/00* (2006.01)
(52) U.S. Cl. .................................. 356/139.1
(58) Field of Classification Search ............... 356/139.1
See application file for complete search history.

(56) References Cited

U.S. PATENT DOCUMENTS 4,450,353 A * 5/1984 Sjolund ............... 250/231.1
5,278,414 A * 1/1994 Samuelson et al. .......... 250/349
5,373,153 A * 12/1994 Cumberledge et al. ... 250/231.1
6,392,223 B1 * 5/2002 Hjertman et al. ........ 250/231.1
2002/0144418 A1 * 10/2002 Endo et al. ............... 33/366.24

* cited by examiner

*Primary Examiner*—Isam Alsomiri
(74) *Attorney, Agent, or Firm*—Pro-Techtor Int'l Services; Ralph Willgohs

(57) ABSTRACT

An inclined detector comprises: a detector body provided with an interior containing space including a lower alcove which is funnel-shaped; a pair of detection components including a transmitting component and a receiving component, wherein, the transmitting component is used to transmit a first signal which goes through the said containing space of the detector body, and the receiving component is used to receive the first signal transmitted by the transmitting component; and a ball disposed in the containing space of the detector body, wherein the ball stays at the bottom center of the lower alcove of the containing space when in a static state. By such arrangements, when the detector body is inclined to make the ball leave the former place where the ball is when in a static state, the receiving component will transmit a second signal for controlling after receiving the first signal transmitted by the transmitting component.

4 Claims, 3 Drawing Sheets

INCLINED DETECTOR

BACKGROUND OF THE INVENTION

1. Field of the Invention

The present invention relates to an inclined detector, and more particularly to an inclined detector which can be used in electronic (electrical) products to detect whether the electronic (electrical) products are inclined, so as to assure the security and the optimal steady working state of the electronic (electrical) products.

2. Description of the Prior Art

An inclined detector is widely used in a variety of electronic (electrical) products such as fan heaters, electric heaters and so on. When the electronic (electrical) product is inclined, it outputs a control signal automatically to control the open or closed state of the electronic products. For example, when the electronic (electrical) products work in an inclined state, the components life will be reduced, even causing unpredictable danger. Thus, the inclined detector has industrial value for the electronic (electrical) products.

However, some conventional inclined detectors have a mechanical structure which uses metal contact to turn on or turn off the electronic (electrical) products. The operation is mostly controlled by current, so sparks are easily generated to oxidate the contacts, and finally causing bad contact. Some other conventional inclined detectors use horizontal control switch. Conductive mercury is injected into an airtight container at the sidewall of which a contact electrode is disposed. When the detector is inclined, the mercury in the airtight container will cover the contact electrode, causing short circuit, and the power will be cut off, so as to prevent the bad influence causing by the electronic (electrical) product which is working in an inclined state.

The said conventional inclined detector with a mechanical structure generates sparks easily, so it obviously has safety troubles. Moreover, the inclined detector controlled by mercury does not meet the market demand of environment protection nowadays because the mercury is poisonous.

The present invention has arisen to mitigate and/or obviate the afore-described disadvantages.

SUMMARY OF THE INVENTION

The primary objective of the present invention is to provide an inclined detector which can be widely used in a variety of electronic (electrical) products. When the electronic (electrical) products are inclined, the power will be cut off automatically or a warning signal will be output, so as to improve the security of using the electronic (electrical) products.

In order to achieve the abovementioned objective, the inclined detector in accordance with the present invention comprises: a detector body provided with an interior containing space including a lower alcove which is funnel-shaped; a pair of detection components including a transmitting component and a receiving component, wherein, the transmitting component is used to transmit a first signal which goes through the said containing space of the detector body, and the receiving component is used to receive the first signal transmitted by the transmitting component; and a ball disposed in the containing space of the detector body, the ball staying at the bottom center of the lower alcove of the containing space when in a static state. By such arrangements, when the detector body is inclined to make the ball leave the former place where the ball is when in a static state, so the receiving component will transmit a second signal for controlling after receiving the first signal transmitted by the transmitting component.

DETAILED DESCRIPTION OF THE PREFERRED EMBODIMENTS

The present invention will be clearer from the following description when viewed together with the accompanying drawings, which show, for purpose of illustrations only, the preferred embodiment in accordance with the present invention.

Figure 1:
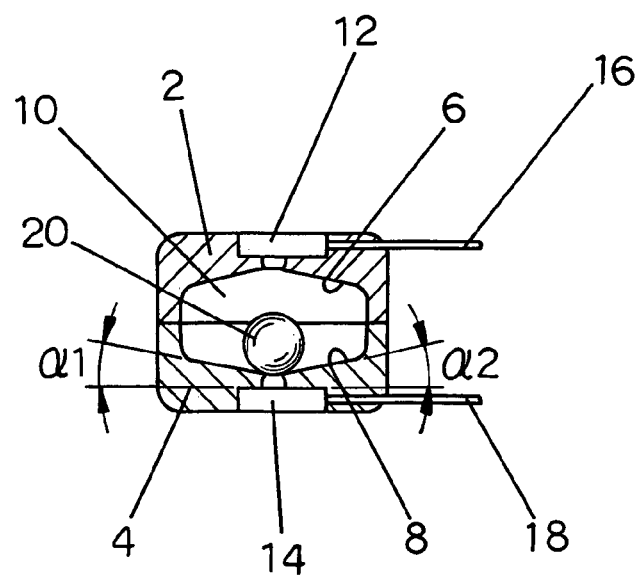
FIG. 1 is an interior structure view of an inclined detector in accordance with the preferred embodiment of the present invention.
Figure 2:
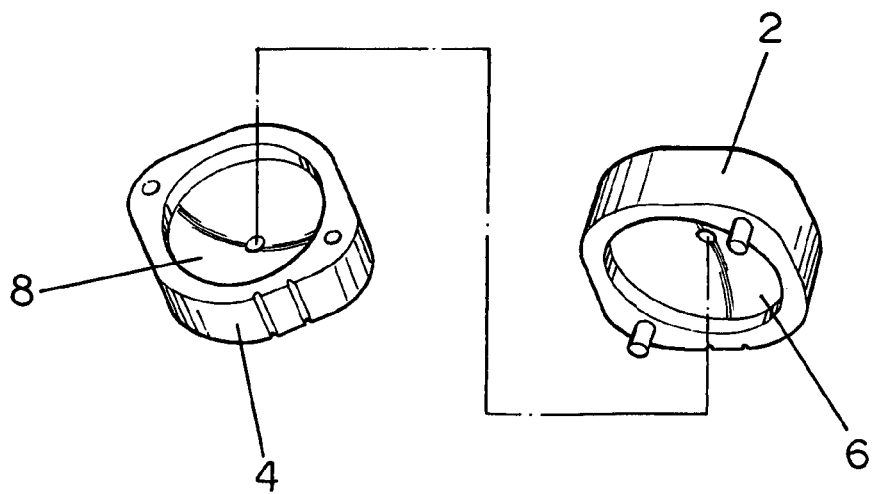
FIG. 2 is an exploded view of a detector body of the inclined detector in accordance with the preferred embodiment of the present invention.

Referring to FIGS. 1 and 2, an interior structure view of an inclined detector and an exploded view of a detector body in accordance with the preferred embodiment of the present invention are shown, comprising:

a detector body combined and fixed by two rinds including an upper rind 2 and a lower rind 4, wherein, the upper rind 2 and the lower rind 4 are respectively provided with a upper alcove 6 and a lower alcove 8 which are funnel-shaped; an angle α1 and an angle α2 will respectively formed between the funnel-shaped inclined walls and the level surface, the angle α1 is equal to the angle α2; and with a combination of the upper rind 2 and the lower rind 4, a containing space 10 is formed by the upper alcove 6 and the lower alcove 8;

a pair of detection components including a first detection component having a first transmitting component 12 and a second detection component having a receiving component 14, wherein, the first transmitting component 12 is electrically connected to a first pin 16 for transmitting a first signal such as a infrared signal which goes through the said containing space 10 of the detector body; in the preferred embodiment, it is optimal to make the first signal go through the center of the containing space 10; and the receiving component 14 is electrically connected to a second pin 18 for receiving the first signal transmitted by the first transmitting component 12;

a ball 20 disposed in the containing space 10 of the detector body, wherein, when the detector body is in a normal state which means it is not inclined, the ball 20 is in a static state and stays at bottom center of the lower alcove 8 of the lower rind 4; thus, when the detector body is in a static state, the ball 20 obstructs the first signal transmitted from the first transmitting component 12, so that the receiving component 14 will not receive the first signal transmitted from the first transmitting component 12, therefore, the detector body is in a normal working state; when the detector body is inclined to exceed a specified angle, so as to make the ball 20 leave the former place where the ball 20 is when in a static state, a second transmitting component portion of the receiving component 14 will transmit a second signal for controlling after receiving the first signal transmitted by the first transmitting component 12.

The said first transmitting component 12 and said receiving component 14 are corresponding disposed at the outer side of the containing space 10 of the detector body.

Figure 3A:
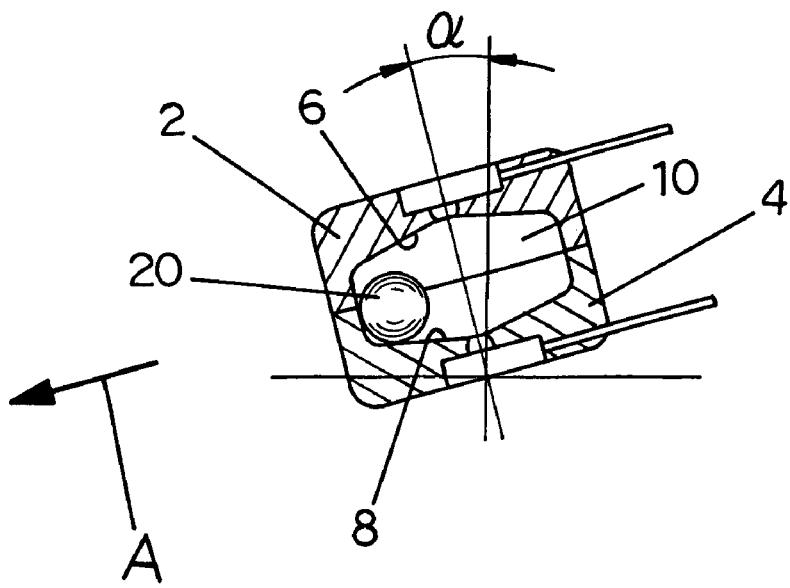
FIGS. 3A and 3B are interior structure views when the inclined detector is in an inclined state in accordance with the preferred embodiment of the present invention.
Figure 3B:
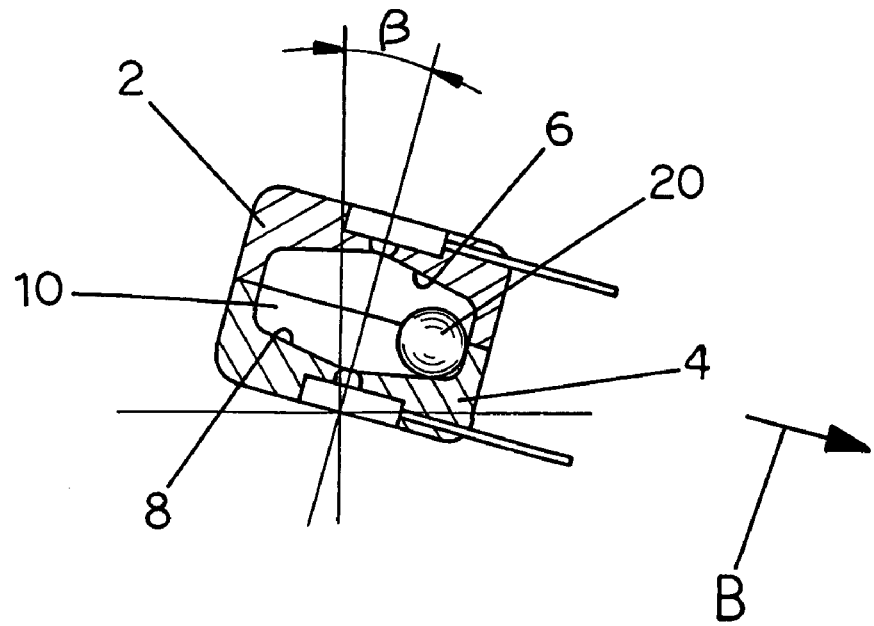

Referring to FIG. 3A, it is an interior structure view when the inclined detector is in an inclined state in accordance with the preferred embodiment of the present invention. When the detector body is inclined at an arrowhead A direction to exceed a specified angle such as α, the ball 20 will move from the bottom center of the lower alcove 8 of the lower rind 4 to the lateral side of the containing space 10. Referring to FIG. 3B, when the detector body is inclined at an arrowhead B direction to exceed a specified angle such as β, the ball 20 will move from the bottom center of the lower alcove 8 of the lower rind 4 to the other lateral side of the containing space 10. Thus, the inclined state can be detected by the moving of the ball 20.

Figure 4:
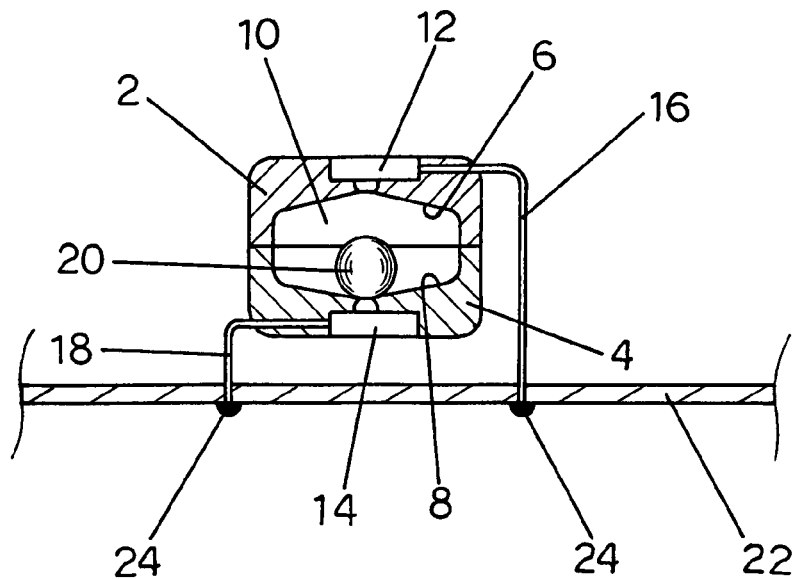
FIG. 4 is an assembly view of the inclined detector and a level circuit board in accordance with the preferred embodiment of the present invention.

Referring to FIG. 4, it is an assembly view of the inclined detector and a level circuit board in accordance with the preferred embodiment of the present invention. The first pin 16 electrically connected to the first transmitting component 12 and the second pin 18 electrically connected to the receiving component 14 can be bended in a proper angle and assembled with a level circuit board 22 fixed by solder 24, so as to make the ball 20 in a static state and stay at the bottom center of the lower alcove 8 of the lower rind 4 when the detector body is in a normal state which means it is not inclined.

Figure 5:
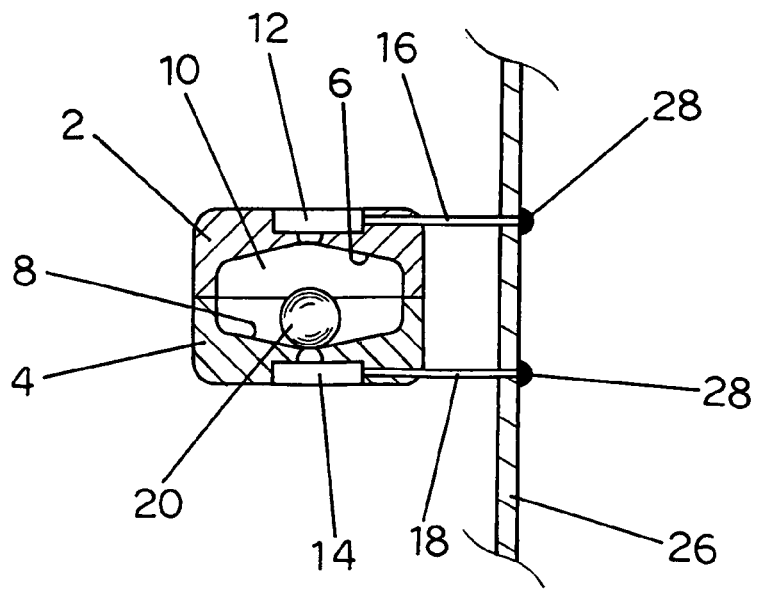
FIG. 5 is an assembly view of the inclined detector and a vertical circuit board in accordance with the preferred embodiment of the present invention.

Referring to FIG. 5, it is an assembly view of the inclined detector and a vertical circuit board in accordance with the preferred embodiment of the present invention. The first pin 16 electrically connected to the first transmitting component 12 and the second pin 18 electrically connected to the receiving component 14 can be directly assembled with a vertical circuit board 26 fixed by solder 28, so as to make the ball 20 in a static state and stay at the bottom center of the lower alcove 8 of the lower rind 4 when the detector body is in a normal state which means it is not inclined.

Whether the said inclined detector is assembled with level circuit board or vertical circuit board, when the detector body is in a static state, the ball 20 obstructs the first signal transmitted from the first transmitting component 12, so that the receiving component 14 will not receive the first signal transmitted from the first transmitting component 12, therefore, the detector body is in a normal working state. When the detector body is inclined to exceed a specified angle, the ball 20 moves from the former place where the ball is when in a static station, the second transmitting component portion of the receiving component 14 transmits a second signal for controlling after receiving the first signal transmitted by the first transmitting component 12. Thus, when the electronic (electrical) products provided with the inclined detector in accordance with the preferred embodiment of the present invent is inclined to exceed a specifically angle, the electronic (electrical) products will output a warning signal or cut off the power automatically by the circuit, so as to assure the safety of using the electronic (electrical) products and prevent the components of the electronic (electrical) products from damaging at the case of going on working when in a inclined state.

The conventional mechanical detection structure is likely to generate sparks to oxidate the contacts, consequently causing bad contact. Moreover, the inclined detector using mercury has environment protection troubles of high pollution. The present invention obviates the above-mentioned disadvantages, so the design of the present invention has utility, novelty and improvement.

While we have shown and described various embodiments in accordance with the present invention, it is clear to those skilled in the art that further embodiments may be made without departing from the scope of the present invention.

What is claimed is:

1. An inclined detector comprising:
    a detector body provided with an interior containing space including a lower alcove which is funnel-shaped with a converging circular horizontal cross-section;
        a first detection component including a first transmitting component; and
        a second detection component having a receiving component and a second transmitting component portion, wherein, the first transmitting component is used to transmit a first signal which goes through the said containing space of the detector body, to be received by the receiving component; and
    a ball disposed in the containing space of the detector body, wherein, the ball stays at the bottom center of the lower alcove of the containing space when in a static state, so as to obstruct the first signal transmitted from the said first transmitting component, and the said receiving component will not receive the first signal transmitted from the first transmitting component;
    wherein the first signal transmitted by the first transmitting component is an infrared signal;
    whereby when the detector body is inclined to make the ball leave the former place where the ball is when in a static state, thus, the second transmitting component portion in the receiving component will transmit a second signal for controlling after receiving the first signal transmitted by the first transmitting component.

2. The inclined detector as claimed in claim 1, wherein the detector body includes an upper rind and a lower rind.

3. The inclined detector as claimed in claim 2, wherein the upper rind is provided with an upper alcove which is funnel-shaped with a converging circular horizontal cross-section.

4. The inclined detector as claimed in claim 1, wherein the first transmitting component and the receiving component are correspondingly disposed at the outside of the containing space of the detector body.

* * * * *